July 12, 1949.  H. HERMANNY  2,475,894
PRESSURE RESPONSIVE MECHANISM
Filed Aug. 19, 1944
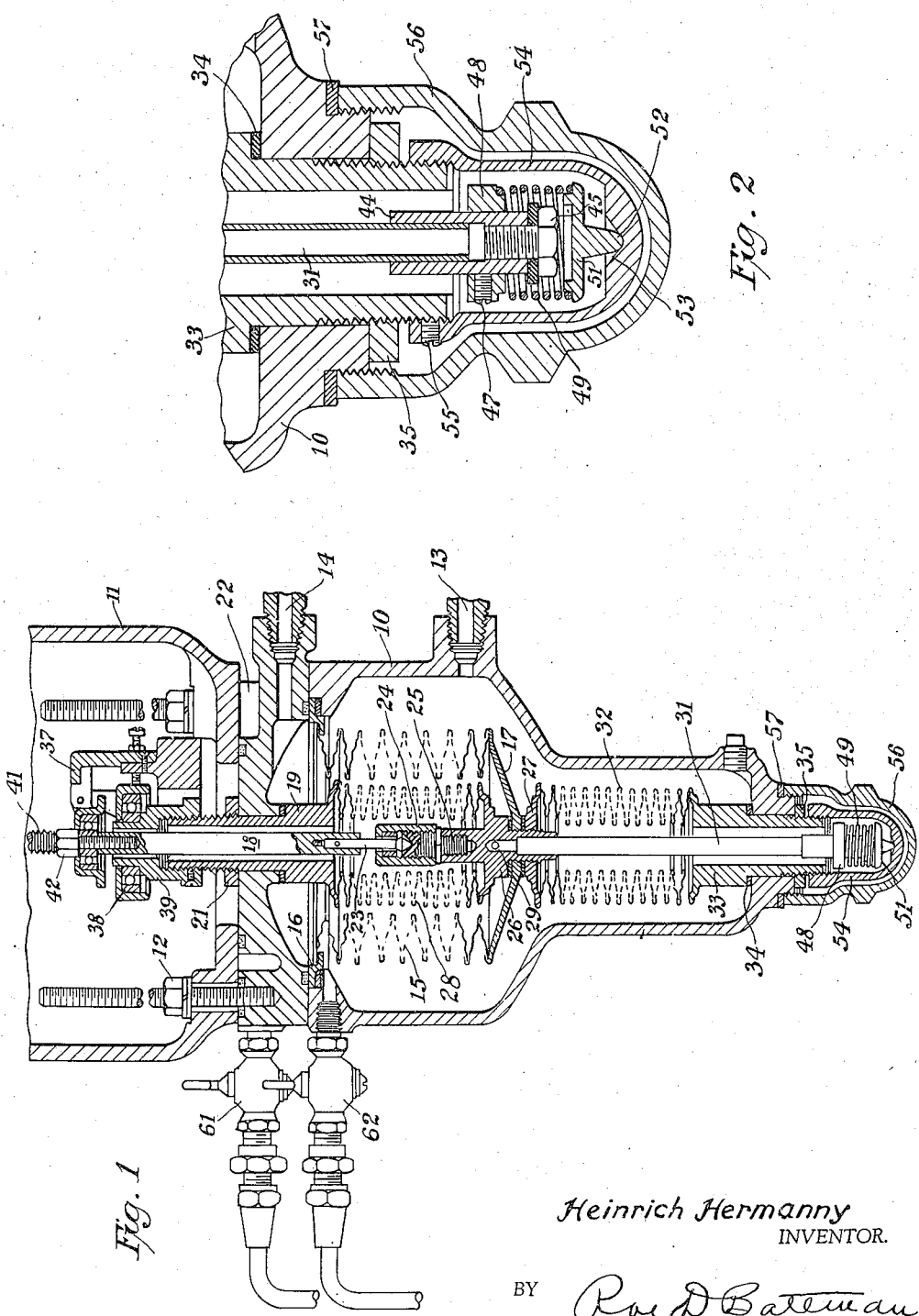
Heinrich Hermanny
INVENTOR.
BY Roy D Bateman
ATTORNEY.

Patented July 12, 1949

2,475,894

UNITED STATES PATENT OFFICE 2,475,894

PRESSURE RESPONSIVE MECHANISM

Heinrich Hermanny, Valley Stream, N. Y., assignor to Bendix Aviation Corporation, Brooklyn, N. Y., a corporation of Delaware Application August 19, 1944, Serial No. 550,296

2 Claims. (Cl. 137—156.5)

1

The present invention relates to pressure responsive mechanisms and is more particularly concerned with mechanisms in which the dynamic and static pressures developed by a Pitot tube are applied to the opposite sides of a flexible diaphragm or the like, and the movements of the diaphragm are transmitted outside of the pressure chamber and utilized to actuate an indicator or the like.

In prior devices of this character, particularly those employed as ships' logs, and in which the movement of the diaphragm is transmitted outwardly of the pressure chamber by means of a rod, it has been necessary to employ a bellows-like device to seal the opening for the rod. Since this sealing bellows introduces an error due to varying static pressures, a second bellows, substantially the same as the sealing bellows must be employed and so connected as to balance the forces exerted by said sealing bellows. I have found that it is impossible, as a practical matter to design two sealing devices having identically the same operating characteristics, so that they will exactly balance each other and avoid adversely affecting movements of the diaphragm under high static pressures, such as are encountered in a submarine. In such constructions, it has been discovered that no matter how accurately the bellows devices are constructed, when the device is assembled and subjected to equal static and dynamic pressures, the diaphragm assembly will undergo an axial deflection of sufficient extent to introduce a substantial error into the indications of the instrument with which the assembly is associated.

While the reason for this action of the sealing bellows is not fully understood, I have discovered that by employing a rod connected directly to the diaphragm and acting upon it with adjustable spring pressures, a simple, efficient structure is provided in which the differences in behavior of the two sealing devices under various pressures may be readily compensated for and the errors of the instrument thereby eliminated.

It is accordingly the major object of the invention to provide pressure responsive devices embodying a plurality of sealing devices with novel means for compensating for the differences in operating characteristics of the sealing devices in response to static pressure, whereby the motion transmitted outwardly of the pressure chamber is directly proportional to the differential pressures exerted upon the main diaphragm, even when the static pressures are of excessive magnitude.

2

Another important object is to provide a pressure responsive device having a fluid pressure responsive diaphragm with a force transmitting element accessible outside the pressure chamber and equipped with an adjustable spring for exerting forces of variable magnitude upon the main diaphragm to compensate for extraneous forces such as gravity which might adversely affect operation of the device.

Further objects will become apparent as the specification proceeds in conjunction with the annexed drawing, and from the appended claims.

In the drawings:

Fig. 1 is a vertical sectional view through a ship's log embodying the invention;

Fig. 2 is a similar view, on an enlarged scale, of the construction shown in Fig. 1.

With continued reference to the drawings, in which like reference characters have been employed to designate similar parts throughout the several views, the device is installed in a two-part casing made up of lower and upper sections 10 and 11 respectively, and an intermediate section 22, and which are secured together in any suitable manner, as by means of nut and stud assemblies 12. The lower chamber and the intermediate section are provided with dynamic and static pressure lines 13 and 14 respectively, which communicate with the exterior and interior of a main bellows 15, which is secured at its upper end to a clamping ring 16 gripped between the intermediate and lower housing sections. Bellows 15 is secured at its lower end to a main diaphragm 17. Movements of the latter, in response to the application of differential pressure to bellows 15, are transmitted to the exterior of the housing by means of a rod 18 working in a shouldered header 19, the latter being held in place by a nut 21 threaded onto its shank and bearing against the top of intermediate section 22. Rod 18 is secured to diaphragm 17 by means of couplers 23 and 24, the latter being secured to a stud 25 threaded into a header 26. Header 26 has a reduced portion threaded into a central opening in diaphragm 17, and onto which is also threaded a second header 27.

The device is sealed against liquid escape along rod 18 by means of a sealing bellows 28, which as seen in Fig. 1 is secured at its upper and lower edges to headers 19 and 26 respectively. Header 26 is also provided with a drain opening 29, communicating with a downwardly extending drain pipe 31, for a purpose that will presently appear.

In order to balance or offset the reduction in effective area of diaphragm 17 through incorporation of sealing bellows 28, similar sealing bellows 32 is installed in the lower part of housing 10, and is secured at its upper end to header 27. The lower end of bellows 32 is secured to a shouldered header 33, which is pulled into tight sealing engagement with a gasket 34 by means of a nut 35 bearing against the bottom of the housing.

From the foregoing disclosure, it is apparent that diaphragm 17, in response to the application of differential pressures by way of fittings 13 and 14, will move upwardly in the housing and transmit its motion through rod 18 to the upper housing section. The latter incorporates a rotating counter-weight assembly 37 supported by means of an anti-friction bearing 38 on a fitting 39 threaded onto the upper end of header 19, for compensating for the decrease in pull of gravity upon the bellows assembly when the ship rolls, as is more fully disclosed and claimed in the co-pending application of Morris F. Ketay, et al., Serial Number 502,210, filed September 13, 1943, for Indicating mechanism, now Patent No. 2,409,435 granted October 15, 1946, which may be referred to for a more detailed disclosure.

A second rod 41, threaded into the upper end of rod 18, and locked in place by a lock nut 42, transmits the differential or resultant force to the transmitter mechanism (not shown).

Inasmuch as the speed and distance indications of the log mechanism are directly dependent upon the movements of rod 41, any variations in the movement of the rod, set up through differences in behavior of the two sealing devices 28 and 32, when subjected to pressure, will be reflected as an error in the indications of the device. The novel means devised for compensating for any such differences in "rate" will now be described.

Rigidly secured to the lower end of conduit 31 is a fitting 44, which is internally threaded to receive a cap screw 45 and a sealing gasket, whereby the tube may be sealed at its lower end against liquid leakage from the space between upper bellows 15 and 28. This chamber may be readily drained when desired by removing screw 45.

Tightly engaging fitting 44, and locked thereon by means of a set screw 47, is a collar 48 providing a seat for a compression spring 49, which bears at its lower end against a rocker form of spring seat 51. The latter has a fulcrum 52 seating in a recess 53 of a yoke 54, which is threaded onto the lower end of header 33 and is locked in place by a set screw 55. A cap 56 is threaded onto the lower end of the housing to protect the parts against damage during handling and when in use. A plate 57 is clamped between the cap and the housing and may bear suitable legend, such as "Caution, do not remove bellows adjustment."

From the foregoing disclosure it is apparent that movement of rod 18 is influenced by the inherent resilience of the main bellows 15 as well as by that of the sealing bellows 28 and 32. Also, spring 49 acting through conduit 31, urges the diaphragm and rod assembly upwardly and it is apparent that by removing cap 56 and loosening set screw 55, and rotating yoke 54 to thread it up or down on the shank of header 33, the stress in spring 49 may be varied to impart the desired action to the bellows assembly.

For instance, the following procedure has proven effective in the calibration of ships' logs:

The static and dynamic lines of the bellows chamber are connected in parallel to a pressure pump and subjected to the same pressures at all times. Before raising the pressure, the pointer of the indicator mechanism is set to zero by means of a zero adjustment (not shown).

The pressure is then increased to 100 or 200 p. s. i. as the case may require, and the deviation of the instrument (the pointer should remain at zero) is noted. In other words, the bellows undergoes a slight endwise travel notwithstanding the fact that the inside and outside of the main bellows are subjected to the same pressure and the outside of both sealing bellows are subjected to equal pressures.

Let's assume the pointer indicates 1 knot.

Then the compensating spring 49 is compressed by means of an upward adjustment of yoke 54 until the pointer indicates 2 knots. This is done inasmuch as upward movement of bellows end 17 and rod 18 in response to increasing fluid pressure results in a positive reading of the log chosen for illustration, and it has been found that to properly compensate the bellows it is necessary to spring urge the bellows in a positive direction, namely, in the same direction in which it is urged by the fluid pressure. The pressure then is removed and the pointer of the indicator will drop to, say, 1.3 knots.

By means of the zero adjustment the pointer is again made to indicate zero knots.

The pressure within the chamber is again increased. The pointer now rises to .6 knot. The spring is compressed until the log indicates 1.2 knots. The pressure is then reduced as before. The pointer drops to .7 knot.

If the cycle is repeated once more, the diving error will, for all practical purposes, have been eliminated. The foregoing procedure has been found to be very satisfactory in practise and it is to be understood that the selection of the values is arbitrary. For instance in the example given when the log indicates 0.6 knot the spring is adjusted to approximately double the indication, namely, 1.2 knots. Obviously it is not necessary to vigorously adhere to these values, but to merely adjust the spring in stages until the zero error has been eliminated.

If during the foregoing procedure the log indications should become negative for increasing pressure, then the spring is adjusted too tight and must be backed off.

After the yoke has been adjusted to the proper position, the set screw 55 is tightened, thus locking it in place.

The intermediate and lower housing sections are provided with air vents communicating with stop cocks 61 and 62 respectively, which may be opened to vent air from the static and dynamic pressure chambers.

From the foregoing detailed disclosure of the invention it is apparent that I have provided a novel bellows assembly embodying a simple effective means for compensating for any differences in behavoir under pressure or flexing characteristics of the several bellows, and in the case of the ship's log apparatus disclosed, it has made it possible to secure an extremely accurate measuring instrument, even when extreme depths are encountered.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed is:

1. A fluid pressure responsive device for actuating an indicator, in response to the difference between the static pressure in a fluid and the dynamic pressure resulting from motion of a Pitot tube through said fluid, said device comprising: a housing formed of rigid walls; a flexible diaphragm means dividing said housing into two chambers; an inlet for said static pressure in communication with one of said chambers; an inlet for said dynamic pressure in communication with the other chamber; means for transmitting motion of said diaphragm means to the exterior of said housing; a pair of sealing devices extending from opposite sides of said diaphragm means through said two chambers to said housing for isolating opposite portions of said diaphragm means from said two chambers, said motion-transmitting means extending to the exterior of said housing through one of said sealing means, and said two sealing means having substantially identical effective pressure areas and resistances to endwise expansion and contraction in response to movement of said diaphragm means, whereby each sealing means substantially but not completely compensates for the effect produced on the diaphragm by the other sealing means; a motion-transmitting member extending from said diaphragm means through said other chamber to the exterior of said housing and sealed from said other chamber by the sealing means extending therethrough; a spring seat on the outer end of said member; an element threadedly connected to said housing and having a fulcrum spaced from the said spring seat; rocker means cooperating with said fulcrum means and having a spring seat opposite said first mentioned spring seat; and a compression spring disposed between said spring seats and urging said member inwardly.

2. A device according to claim 1 adapted to be positioned with said motion-transmitting member extending downwardly from said diaphragm means, in which said motion-transmitting member is hollow and communicates at its upper end with the upper side of said diaphragm member, and valve means at the lower end of said motion-transmitting member for draining liquid from said one chamber.

HEINRICH HERMANNY.

REFERENCES CITED

The following references are of record in the file of this patent:

UNITED STATES PATENTS

| Number | Name | Date |
| --- | --- | --- |
| 1,074,306 | Wolf | Sept. 30, 1913 |
| 1,323,119 | Sundbaum | Nov. 25, 1919 |
| 1,753,469 | Melas | Apr. 8, 1930 |
| 1,819,370 | Hvid | Aug. 18, 1931 |
| 2,079,069 | Johnson | May 4, 1937 |
| 2,348,113 | Davis | May 2, 1944 |
| 2,361,885 | Tate et al. | Oct. 31, 1944 |

FOREIGN PATENTS

| Number | Country | Date |
| --- | --- | --- |
| 292,859 | Great Britain | 1928 |